United States Patent [19]

Davenport et al.

[11] Patent Number: 5,317,484
[45] Date of Patent: May 31, 1994

[54] COLLECTION OPTICS FOR HIGH BRIGHTNESS DISCHARGE LIGHT SOURCE

[75] Inventors: John M. Davenport, Lyndhurst; Richard L. Hansler, Pepper Pike; Kenneth S. King, Willoughby Hills, Ohio; William J. Cassarly, Clifton Park, N.Y.

[73] Assignee: General Electric Company, Schenectady, N.Y.

[21] Appl. No.: 11,562

[22] Filed: Feb. 1, 1993

[51] Int. Cl.⁵ ............................................. F21V 7/06
[52] U.S. Cl. ...................................... 362/32; 362/302; 362/346
[58] Field of Search ................ 385/31, 900, 901, 902; 362/32, 298, 302, 304, 346

[56] References Cited
U.S. PATENT DOCUMENTS

| | | | |
|---|---|---|---|
| 4,241,382 | 12/1980 | Daniel | 362/32 |
| 4,389,698 | 6/1983 | Cibie | 362/32 |
| 4,460,939 | 7/1984 | Murakami et al. | 362/32 |
| 4,755,918 | 7/1988 | Pristash et al. | 362/32 |
| 4,883,333 | 11/1989 | Yanez | 362/32 |
| 5,117,312 | 5/1992 | Dolan | 362/32 |

Primary Examiner—Ira S. Lazarus
Assistant Examiner—Alan B. Cariaso
Attorney, Agent, or Firm—George E. Hawranko; Stanley C. Corwin

[57] ABSTRACT

Improved collection optics for a lighting system comprised of a light source, reflector and light receptive component include a multi-portion reflector or a nonimaging optical collector having a positive curvature located at an input end to the light receptive component. The collection optics capture additional lumens for transmission through the light guide. The optical arrangement can also collect different colors of light from the source that would otherwise be omitted from transmission through the light receptive component.

14 Claims, 2 Drawing Sheets

COLLECTION OPTICS FOR HIGH BRIGHTNESS DISCHARGE LIGHT SOURCE

BACKGROUND OF THE INVENTION

This invention relates to collection optics for a high brightness discharge light source. More particularly, the invention relates to modification of known optical arrangements which use an elliptical or ellipsoidal reflector with a high brightness light source located at a first focal point of the reflector and an input end of a light receptive component such as a light guide or light conductor placed at a second focus of the reflector for transmitting light to a remote location. However, it will be understood that the invention has broader applications and may be advantageously employed in a number of other lighting environments and applications. Particular lighting systems require a high level of lumens for selected applications. For example, when using an optical fiber or light guide to carry the light to a remote location in the system, it is important to collect a maximum amount of the light emitted from the light source and input the light into the end of the light guide. The amount of light can be measured as number of lumens per unit area, i.e., lumen density, and the transmission optics plays an important role in maximizing the lumen density.

Typically, there is a tradeoff between lumen density and the cross-sectional dimension of the light guide. In general, the smaller the size of the light guide, the higher the lumen density. This higher density, however, comes at the expense of less collected lumens. Decreasing the size of the entrance aperture is also limited by the requirement that the transition optics must be sufficiently enlarged relative to the magnified image of the source in order to collect sufficient lumens. Therefore, it is generally preferred to maintain a slightly larger entrance aperture which, in turn, requires collection of a greater number of lumens from the light source to achieve the goal of increased lumen density.

An elliptical or truncated elliptical reflector is often used to direct light received from the discharge light source into the light guide. Unfortunately, any light emitted from the light source at a region adjacent to, but slightly spaced or offset from, the first focus is not directed into the light guide. Light from the offset region is imaged or focused at an area spaced from the input end of the light guide, and thus does not contribute to the light carried by the light guide. Lumen density in the light guide thus has no contribution from this additional light emitted from the light source.

By way of practical example, a core of an arc discharge light source is preferably located at the first focus of an ellipsoidal reflector, while a plume is also located inside the envelope but at a different region relative to the reflector. For example, the plume is located closer to the reflector if the arc is operated in a vertical direction and the open end of the ellipsoid is pointed downwardly. Sodium emission is primarily provided by the plume which is a region of slightly lower temperature than the arc core. In the core, the temperature is too high and completely ionizes the sodium. Thus, light emitted from the core does not result from sodium emission. Instead, convection currents within the envelope carry the sodium to regions of lower temperature and light is emitted in these lower temperature regions. Unfortunately, the regions of lower temperature are sufficiently spaced from the core, and thus spaced from the first focus of the reflector, so that this sodium light emission is not positioned at the second focus of the reflector. The sodium plume would, in fact, be focused well beyond the second focus of the reflector, missing entirely the entrance end of a small light guide. As a result of this arrangement, the light propagated through and emitted from the output end of the light guide is lacking in red color and has a green color since the wavelength spectrum of sodium emission is not transmitted through the light guide.

Moreover, different magnifications from different portions of the ellipse are obtained. This non-uniform magnification requires increasingly complex shapes and configurations to match the collector design and maximize the collection of light. Accordingly, there is a tradeoff between complexity and light collection that needs to be addressed.

A simple transition optical arrangement is desired between the light source and the input end of the light guide to maximize the lumen density, collect light from regions adjacent the first focus, and yet maintain simplicity and efficiency.

SUMMARY OF THE INVENTION

The present invention contemplates a new and improved lighting system that increases the light collected through use of preferred optical arrangements associated with a high brightness discharge light source. The light source is disposed at a first focus of an ellipsoidal reflector and directs the light toward a second focus thereof. An input end of a light receptive component is located at the second focus to receive light from the reflector. A non-imaging optical collector cooperates with the input end of the light guide to collect additional light from the light source.

According to a more limited aspect of the invention, a compound parabolic concentrator (CPC) is used with a cone section to increase the light input into the end of the light guide.

According to another aspect of the invention, the reflector includes first and second portions in which the first foci, respectively, are spaced apart and the second foci of the reflector portions are coincident.

A principal advantage of the invention is the ability to add light to the light guide from regions adjacent the light source core of the discharge lamp.

Another advantage of the invention is to increase the amount of lumens collected without altering the size of the entrance aperture of known light guide arrangements.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in the specification and illustrated in the accompanying drawings which form a part hereof, and wherein.

DETAILED DESCRIPTION OF THE PREFERRED EMBODIMENTS

Figure 1:
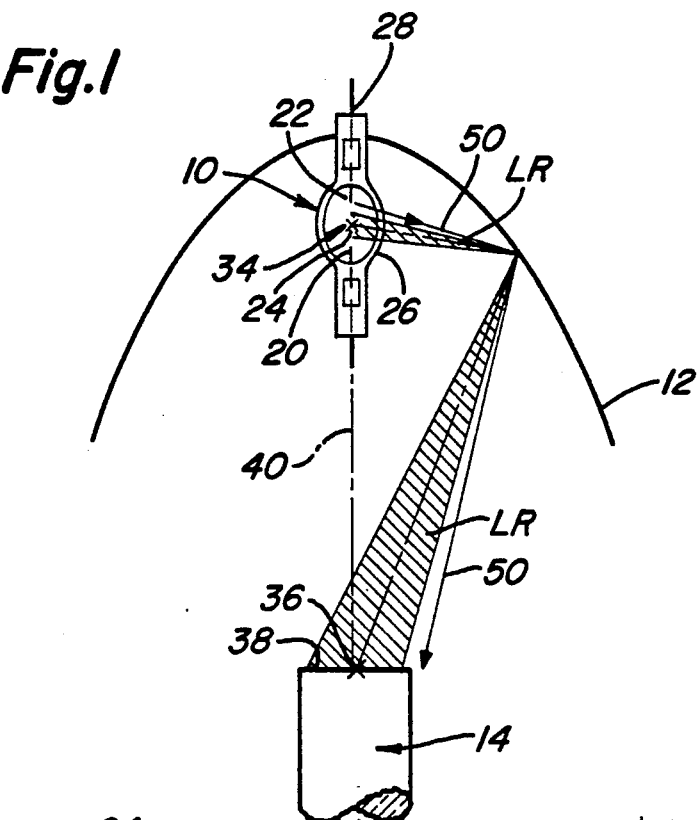
FIG. 1 is an elevational view of a typical lighting system illustrating problems associated with collecting light from a discharge lamp for transmission through a light guide.

Referring now to the drawings wherein the showings are for purposes of illustrating the preferred embodiments of the invention only and not for purposes of limiting same, the FIGURES generally show a light source 10, reflector 12, a light receptive component such as light guide 14, and improved collection optics 16.

More particularly, and with reference to FIG. 1, the light source 10 is shown as an arc discharge lamp having an anode 20 and cathode 22 spaced apart to define an arc gap 24. The inner, terminal ends of the anode and cathode are enclosed in a clear envelope 26 so that light resulting from emissions associated with the supply of electrical current through lead line 28 can be collected by the reflector and conveyed to a remote location by the light guide. Particular details of the structure and operation of the discharge lamp are well known in the art so that further discussion herein is deemed unnecessary to a full and complete understanding of the present invention.

Use of an ellipsoidal reflector allows a designer to selectively locate components of the lighting system at the first and second focus of the reflector and effectively collect a large amount of the light emitted from the light source. Specifically, the light source 10 is generally located at a first focus of the elliptical reflector 12. As represented by numeral 34, the first focus preferably is located in the arc gap 24 between the electrodes so that the high brightness core is coincident therewith. A cross-hatched band of light rays LR represent light from the core that travels through the envelope and is reflected by the ellipsoidal reflector 12. The reflector has a highly polished, mirror-like surface so that an extremely large percentage of incident light from the first focus is reflected toward a second focus 36. As shown, an input end 38 of the light guide 14 is coincident with the second focus. Moreover, the generally planar face of the input end of the light guide is substantially perpendicular to the longitudinal axis of the lighting system, which axis is indicated by numeral 40.

As shown in FIG. 1, selected light rays, such as representative light ray 50 emitted by the light source from a region spaced from the first focus, are reflected by the reflector 12 but miss the input end of the light guide. Since these light rays are emitted from a portion of the light source adjacent the first focus, the elliptical configuration of the reflector will not focus these light rays at the second focus 36, much less focus the light rays over the slightly broader region defined by the input end of the light guide. For example, and as briefly described above, sodium emission from a vertically oriented arc discharge lamp is primarily from a plume located above the core of the discharge. The high temperature of the core completely ionizes the sodium. Only after the hot gases are moved by convection currents to a region of lower temperature, e.g., above the core, are the gases then cooled and a transition from the ionized state obtained whereby light emission occurs. Full ionization of the sodium at the core simply does not provide emission. Accordingly, light transmitted through the light guide will be missing wavelengths of visible light associated with the sodium plume. This red light does not enter the fiber and, therefore, light at the output end (not shown) of the light guide appears green in color.

Figure 2:
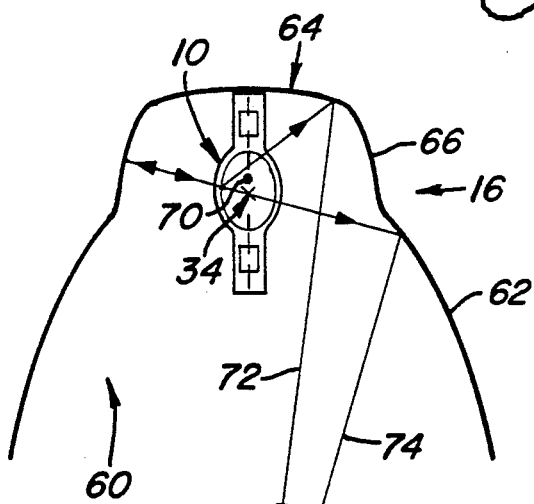
FIG. 2 shows one preferred arrangement addressing the light collection problem of FIG. 1.

The embodiments of FIGS. 2-5 illustrate some preferred solutions to collecting (i) a greater amount of light so that the lumen density is increased without altering the diameter of the light guide, or (ii) capturing different colors in the light guide that are otherwise normally lost. These alternate embodiments identify like elements by like numerals and new elements by new numerals for ease of reference. In FIG. 2, reflector 60 is modified and preferably defined by three portions 62, 64, 66. The first portion 62 has an elliptical conformation in which its first focus is coincident with the core of the light source 10. The second focus 36 of the reflector first portion is disposed at the input end of the light guide.

The second portion 64 of the reflector is also elliptical in conformation. The reflector second portion is positioned relative to the light source and light guide so that its first focus 70 is coincident with the plume of the arc discharge lamp, and its second focus is coincident with focus 36 at the input end of the light guide. Thus, the second foci of the first and second portions of the reflector are commonly located. Light from the core is optically transmitted to the input end of the light guide, as well as light emitted from areas adjacent the core, e.g., the plume.

The third portion 66 of the reflector interconnects the first and second reflector portions 62, 64 and is generally spherical in conformation. As referenced by light ray 74, light from the core is directed back through the core by the reflector third portion so that the light is eventually reflected off reflector first portion 6z to enter the light guide. In other words, the spherical third portion 66 of the reflector has its center of curvature coincident with the first focus of the reflector first portion at the core of the light source.

Figure 3:
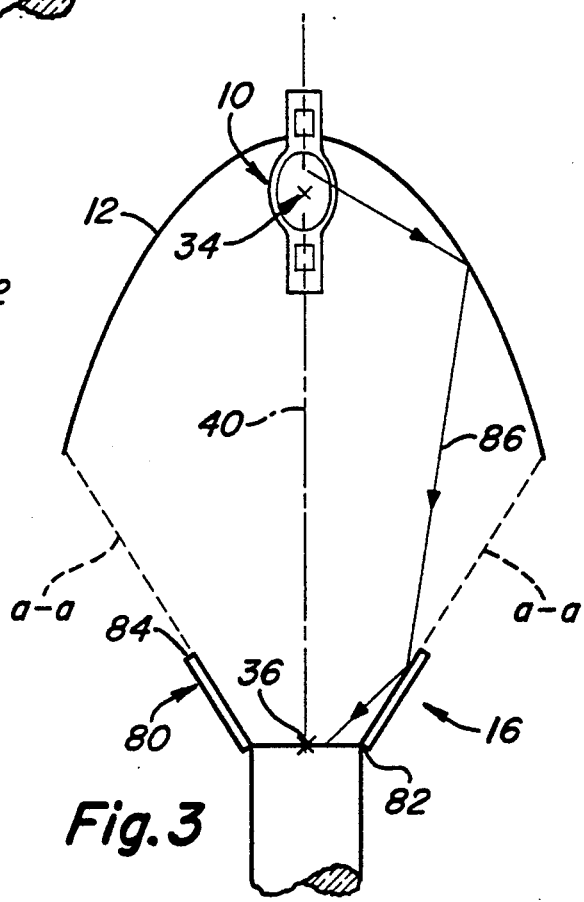
FIG. 3 illustrates a second preferred arrangement for overcoming problems associated with the lighting system of FIG. 1.

In the embodiment of FIG. 3, reflector 12 is elliptical and the first focus 34 disposed at the core of the light source. Likewise, the second focus 36 is centrally aligned at the input end of the light guide. In order to facilitate collection of the light emitted from the plume and other areas adjacent the core, a non-imaging optical collector is located adjacent the input end of the light guide to collect additional light from the light source and direct the light into the light guide. The non-imaging optical collector may be any of a number of surface configurations, but is preferably defined as a surface having a positive curvature. Positive curvature is intended to include a surface that maintains the same angle of curvature, or is concave, relative to both foci on the major axis of the ellipsoidal reflector. For example, positive curvature surfaces would include, but not be limited to, a conical section where the angle remains the same relative to the axis passing through the foci 34, 36, a compound parabolic concentrator (CPC), a compound elliptical concentrator (CEC), or a spherical surface.

As illustrated in FIG. 3, one preferred non-imaging optical collector having a positive curvature is cone section so extending from the input end of the light guide. More specifically, the cone section 80 has a narrowed first end 82 of substantially the same diameter as the input end of the light guide and merges therewith. The cone section tapers outwardly, or increases in diameter, as it extends axially toward the light source and reflector. Preferably, the taper angle is defined by a line that extends from the outer diameter of the entrance to the light guide to the terminal edge of the reflector, the extension of which line is shown as dotted line a—a in FIG. 3. A second end 84 of the cone section is of sufficient diameter to reflect light directed by the reflector from the plume into the input end of the light guide, as illustrated by representative light ray 86, and intercept the largest images of the arc tube formed by the reflector. Thus, light emitted from the light source at an area adjacent the core which would otherwise miss the light guide (FIG. 1) is folded into and captured by the cone section 80.

Figure 4:
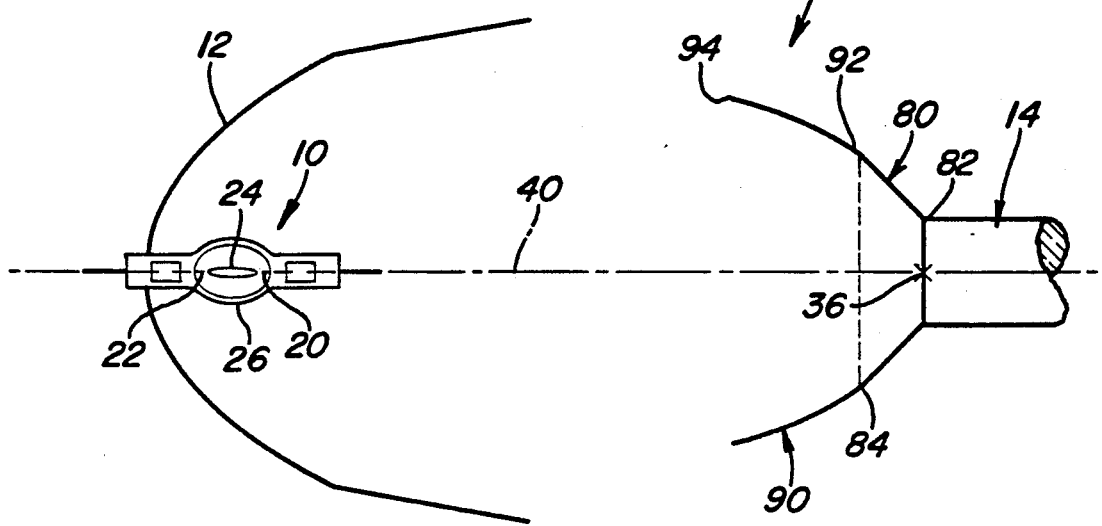
FIG. 4 shows another improved collection optics arrangement for resolving deficiencies associated with the lighting system of FIG. 1; and, FIG. 5 illustrates still another preferred arrangement for maximizing light collected from a light source and reflector.

In the previously described embodiments, the light source and light guide are vertically oriented so that the sodium plume, for example, is disposed above the core of the arc discharge lamp. It is also contemplated that non-vertical orientations of the optical components can effectively capture additional light that would otherwise miss the entrance aperture of the light guide. As shown in FIG. 4, a cone section 80 substantially as described above extends from the terminal end of the light guide. The second end 84 of the cone section, though, is additionally assisted in collection of light by a compound parabolic concentrator 90. The compound parabolic concentrator has a first end 92 of the same diameter as the second end of the cone section to defined a smooth merger or transition therebetween. As is known in the art, the non-imaging compound parabolic concentrator is effective in reflecting and/or collecting light into an aperture of known size. As desired, the overall lumens inputted to the light guide is thus increased through this optical arrangement.

Figure 5:
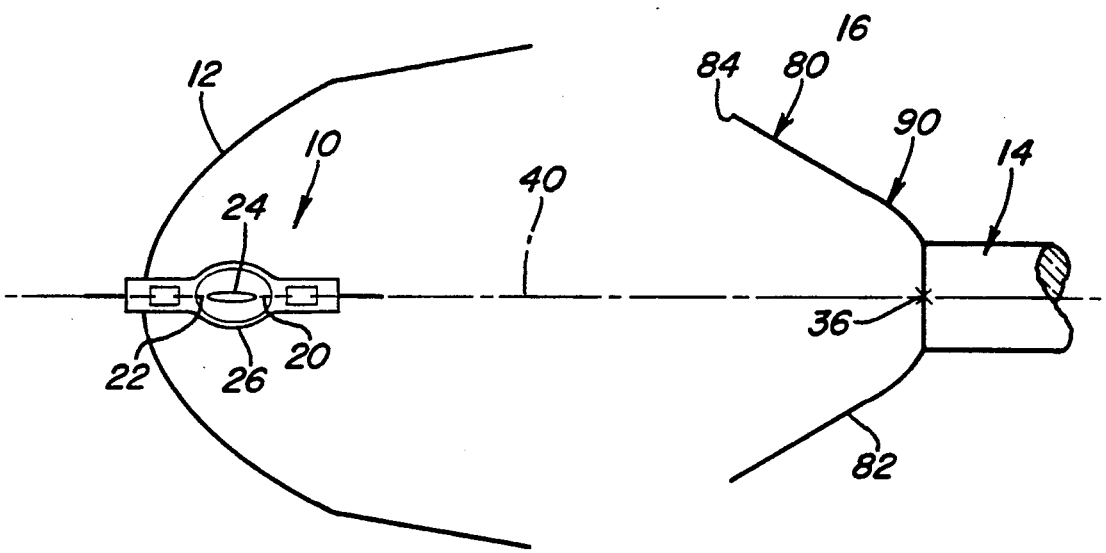

Still another preferred arrangement as shown in FIG. 5 is to locate the compound parabolic concentrator 90 on the input end of the light guide. The left-hand end then merges into a conical section 80 that continues at a constant angle toward the reflector 12. Again, the non-imaging optical components are intended to capture additional light that would otherwise bypass the input end of the light guide.

It is also contemplated that features of the above described embodiments may be used in various ways without departing from the scope and intent of the subject invention. For example, the standard elliptical reflector as described in FIGS. 1 and 3 may be positioned relative to the discharge lamp so that the plume is located at the first focus rather than the core. Because of the magnification effect, the slight displacement of the second focus has little effect. In fact, by focusing some of the light from the plume more accurately on the entrance to the light guide, more red light will be included in the transmitted light. Another example is to combine the cone section or compound parabolic concentrator structures of FIGS. 3-5 with the multi-portion reflector concept of FIG. 2. Still another option is to use other non-imaging concentrators in place of the conical section in FIG. 3 or in combination with the conical or CPC sections in the embodiments of FIGS. 4 and 5.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

What we claim as new and desire to secure by Letters Patent of the United States is:

1. A lighting system comprising:
an elliptical reflective surface having first and second foci;
a light source disposed at the first focus of the reflective surface so that the reflective surface receives light therefrom and directs the light toward the second focus;
a light receptive component having an input end located at the second focus to receive light from the elliptical reflective surface and transmit the light to a remote location;
a non-imaging optical collector having a positive curvature located adjacent the input end of the light receptive component for collecting additional light from the source and directing the light into the input end of the light receptive component; and,
wherein said optical collector is a cone section and further includes a compound parabolic concentrator disposed adjacent said cone section.

2. The lighting system as defined in claim 1 wherein the optical collector has an enlarged end spaced from the input end of the light receptive component and a narrowed end having a diameter substantially the same as the light receptive component input end and merging therewith.

3. The lighting system as defined in claim 1 wherein longitudinal axes of the reflective surface and light source are vertically disposed.

4. The lighting system as defined in claim 1 wherein the optical collector extends generally axially from the input end of the light receptive component toward the first focus.

5. The lighting system as defined in claim 1 wherein the cone section has a narrowed first end that mates with an outside diameter associated with the input end of the light receptive component and increases in dimension at an angle determined by extending a reference line from the outside diameter of the input end of the light receptive component and a terminal edge of the reflective surface.

6. The lighting system as defined in claim 1 wherein the elliptical reflective surface includes first and second portions, a first focus of the reflective surface first portion being located at the core of the light source, and a first focus of the reflective surface second portion being located adjacent the core of the light source.

7. The lighting system as defined in claim 6 wherein the first focus of the reflective surface second portion is located at a plume associated with the light source.

8. The lighting system as defined in claim 6 wherein a second focus of the reflective surface first portion is coincident with a second focus of the reflective surface second portion.

9. The lighting system as defined in claim 6 wherein the first and second portions of the reflective surface are interconnected by a third portion.

10. The lighting system as defined in claim 9 wherein the reflective surface third portion has a center of curvature coincident with a core of the light source.

11. The lighting system as defined in claim 6 wherein the second portion is spaced a greater dimension from the light source than the first portion.

12. A lighting system comprising:
   a light source;
   a light guide having an input end for receiving light from the light source and transmitting the light to a remote location;
   a reflector interposed between the light source and the light guide for receiving light from the light source and directing the light into the light guide, the reflector having first and second portions with each portion having first and second foci, one of the portions having its first focus located at a region spaced from a core of the light source; and
   wherein the reflector first portion has its first focus located at the core of the light source and its second focus located at the input end of the light guide and the reflector second portion has its first focus located at the region spaced from the core and its second focus at the input end of the light guide.

13. The lighting system as defined in claim 12 further comprising a reflector third portion interconnecting the first and second portions.

14. The lighting system as defined in claim 13 wherein the reflector third portion is generally spherical and has a focus located at the core of the light source.